United States Patent
Bayus et al.

(10) Patent No.: US 7,730,343 B2
(45) Date of Patent: Jun. 1, 2010

(54) OPTIMIZATION OF PORT LINK RECOVERY

(75) Inventors: Mark Steven Bayus, Tucson, AZ (US);
Mark P. Bendyk, Hyde Park, NY (US);
Roger Gregory Hathorn, Tucson, AZ (US); Steven Edward Klein, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 11/734,196

(22) Filed: Apr. 11, 2007

(65) Prior Publication Data

US 2008/0256385 A1  Oct. 16, 2008

(51) Int. Cl.
*G06F 11/00* (2006.01)

(52) U.S. Cl. .............. 714/4; 714/43; 370/229

(58) Field of Classification Search .......... 714/4, 714/15, 43, 56; 370/229
See application file for complete search history.

(56) References Cited

U.S. PATENT DOCUMENTS

| | | | | |
|---|---|---|---|---|
| 5,596,575 A * | 1/1997 | Yang et al. | | 370/468 |
| 6,477,171 B1 | 11/2002 | Wakeley et al. | | |
| 6,529,957 B1 * | 3/2003 | Joergensen | | 709/233 |
| 6,728,216 B1 * | 4/2004 | Sterner | | 370/252 |
| 6,791,942 B2 | 9/2004 | Jin | | |
| 7,005,861 B1 | 2/2006 | Lo et al. | | |
| 7,257,739 B2 * | 8/2007 | Quinlan | | 714/43 |
| 2002/0146043 A1 | 10/2002 | McRobert et al. | | |
| 2003/0093459 A1 | 5/2003 | Dowling et al. | | |
| 2003/0107989 A1 * | 6/2003 | Ray | | 370/229 |
| 2004/0243666 A1 | 12/2004 | Wood | | |
| 2005/0055467 A1 * | 3/2005 | Campana et al. | | 709/253 |
| 2005/0207360 A1 * | 9/2005 | Costo et al. | | 370/282 |
| 2005/0234962 A1 * | 10/2005 | Borlick et al. | | 707/102 |
| 2007/0116038 A1 * | 5/2007 | Holt et al. | | 370/465 |
| 2008/0155333 A1 * | 6/2008 | Brundidge et al. | | 714/36 |

OTHER PUBLICATIONS

"Fibre Channel Framing and Signaling-2 (FC-FS-2)", American National Standard for Information Technology, Project T11/1619-D Rev. 1.01, Aug. 2006, pp. 1-77, including Chapter 26—"Link Speed Negotiation".

* cited by examiner

*Primary Examiner*—Robert Beausoliel
*Assistant Examiner*—Joshua P Lottich
(74) *Attorney, Agent, or Firm*—Janaki K. Davda; Konrad Raynes & Victor LLP

(57) ABSTRACT

Provided are techniques for determining a link speed. When a link between two computing devices is operational, a link speed for use in communicating across the link is stored and a remembered indicator is set to TRUE. After any event occurs that causes the link to become inoperational, in response to determining that the remembered indicator is TRUE, the stored link speed is used when attempting to make the link become operational.

15 Claims, 4 Drawing Sheets

OPTIMIZATION OF PORT LINK RECOVERY

BACKGROUND

1. Field

Embodiments of the invention relate to optimization of port link recovery.

2. Description of the Related Art

When two fibre channel ports are connected to each other via fibre channel cable, link initialization occurs before the two ports are able to exchange meaningful data. Part of the link initialization process is to decide the link speed at which the link will operate (i.e., a "link speed"). In most cases, each of the two fibre channel ports are able to support multiple link speeds (e.g., 1 Gb/sec, 2 Gb/sec, 4 Gb/sec, where Gb is gigabits) and are normally configured to execute a link speed negotiation algorithm in order to determine, and thereby operate at, the highest link speed supported by each port. The fibre channel standards provide a link speed negotiation algorithm that is used by fibre channel ports. An example of link speed negotiation may be found in "Fibre Channel Framing and Signaling-2 (FC-FS-2)", Version Rev 1.01, INCITS Working Draft American National Standard for Information Technology, Aug., 8, 2006.

However, there is a need in the art for optimization of port link recovery.

SUMMARY OF EMBODIMENTS OF THE INVENTION

Provided are a method, computer program product, and system for determining a link speed. When a link between two computing devices is operational, a link speed for use in communicating across the link is stored and a remembered indicator is set to TRUE. After any event occurs that causes the link to become inoperational, in response to determining that the remembered indicator is TRUE, the stored link speed is used when attempting to make the link become operational.

BRIEF DESCRIPTION OF THE DRAWINGS

Referring now to the drawings in which like reference numbers represent corresponding parts throughout.

DETAILED DESCRIPTION

Figure 1:
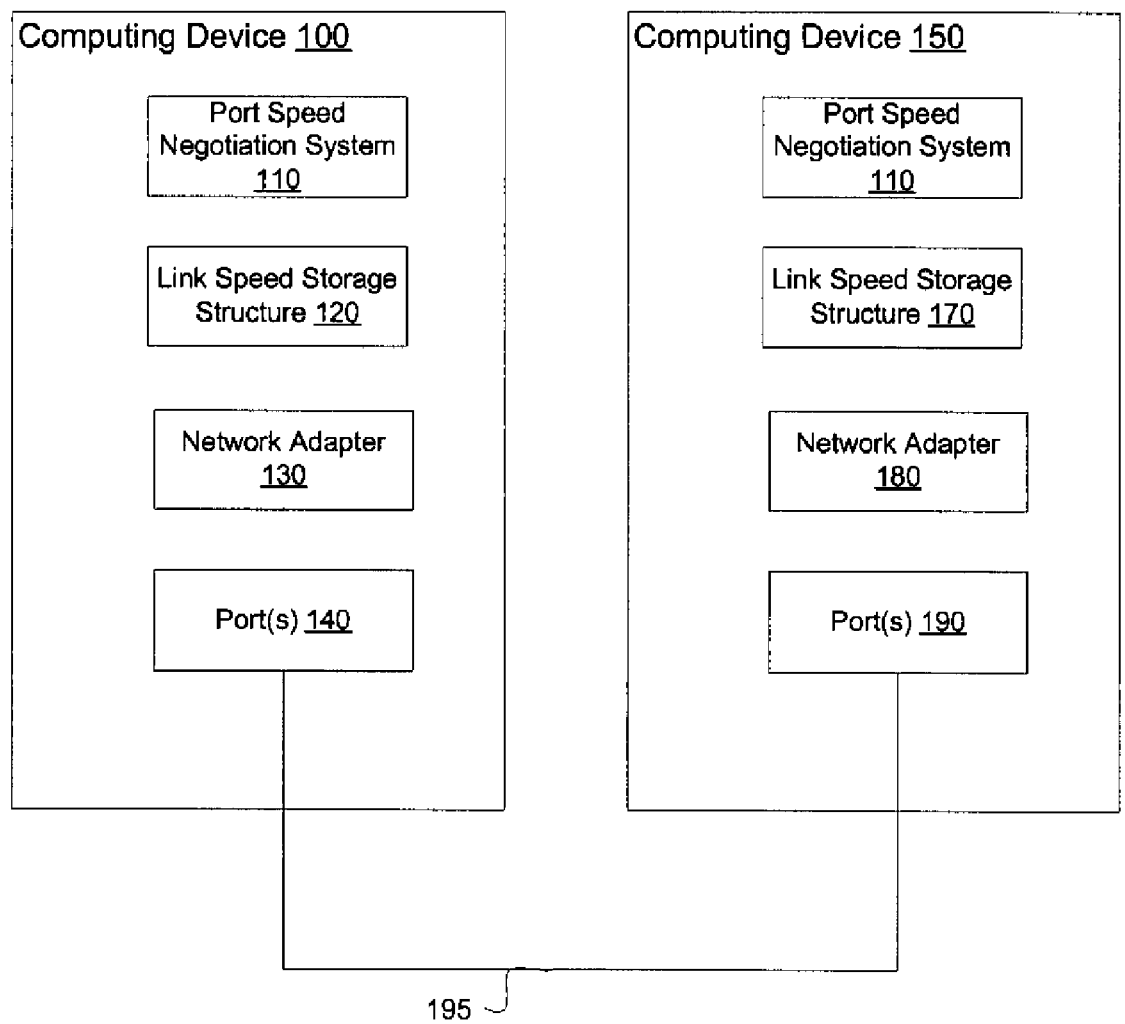
FIG. 1 illustrates details of a computing device in accordance with certain embodiments.

In the following description, reference is made to the accompanying drawings which form a part hereof and which illustrate several embodiments of the invention. It is understood that other embodiments may be utilized and structural and operational changes may be made without departing from the scope of the invention.

Ports normally negotiate link speed any time the link needs to be initialized, which can be caused by many things. For example, link initialization may occur in the following situations:

a) during Initial Microcode Load (IML) of the port
b) when a fibre channel cable is removed and then reattached by a user
c) when a fibre channel cable or port is damaged or malfunctions, causing the link to go down (i.e., be inoperational and unable to transmit meaningful data) and back up (i.e., be operational and able to transmit meaningful data)
d) hardware and/or software resets on the ports (i.e., that is the result of a concurrent codeload)

In the first three situations (a, b, and c), the length of time required to negotiate link speed may not be critical. For situation a, the port was not previously attached to anything. For situation b, the user is moving a cable and would expect a disruption of communication on the link. For situation c, the link is damaged and cannot be expected to negotiate link speed quickly.

However, in situation d, the port knows the link will go down, and can reasonably expect the link to come back up still attached to the same physical port at the other end of the link. Situation d may occur when a hardware and/or software reset is the result of a fibre channel adapter (i.e., a type of network adapter) code update (also referred to as a codeload or concurrent codeload). Concurrent codeload may be described as a code update that is occurring while active Input/Output (I/O) is happening. When a network adapter is updated (i.e., loaded) with new microcode, the network adapter and the ports on the adapter are reset. This may cause light to be dropped on the link, forcing link initialization to re-occur on those ports. In most cases, the expected resulting link speed of this negotiation is the same resulting link speed at which the port was operating before the concurrent codeload.

Due to the nature of concurrent codeload, which occurs when active I/O is happening, the port should become operational again as quickly as possible to avoid path loss that may occur if the storage device's port cannot initialize its link quickly enough after the concurrent codeload. Therefore, one requirement of concurrent codeload is that the concurrent codeload remain as nondisruptive as possible to I/O operations across the link. Preferably, the link should not stay down for more than, for example, 1.5 seconds. A limitation of the link speed negotiation algorithm in the fibre channel standards is that it does not impose a strict requirement on the total amount of time allowed to complete link speed negotiation.

Since the fibre channel standards do not require the link speed negotiation to complete in a fixed amount of time, a problem exists for Upper-Layer Protocols (ULPs) that are sensitive to link disruptions. ULPs include, for example, Fibre Channel Protocol (FCP) for Small Computer System Interface (SCSI) and Fibre Channel-Single Byte Command Codesets-2 (FC-SB-2). ULPs may be described as layers above the link level.

One possible solution to this problem is to require the user to disable link speed negotiation for the storage port in order to avoid the link speed negotiation algorithm altogether. This may impose extra work for the user when upgrading an environment. For example, when replacing a switch that supports a 1 Gbps link speed with a switch that supports a 2 Gbps link speed, the user may have to manually set the link speed of all of the storage ports in the Storage Area Network (SAN) from 1 Gbps to 2 Gbps. Another downside of this solution is that it may also require a user to set the link speed of the ports before they can be used at all, which could be the case if the user's SAN does not support the default link speed of the storage controller's ports.

Thus, there is a need in the art for a solution that will minimize the link speed negotiation phase of link initialization during time critical operations, such as concurrent codeload, but still negotiate link speed during noncritical link initialization and when the link speed may actually change, such as initial IML and SAN reconfiguration.

Embodiments select when to use link speed negotiation and when to disable the link speed negotiation in favor of a fixed link speed that will improve link initialization time and still yield the same operational link speed as link speed negotiation is expected to have yielded. Embodiments address the situation in which a software and/or hardware reset is the result of a fibre channel adapter concurrent codeload.

FIG. 1 illustrates details of a computing device in accordance with certain embodiments. A computing device 100 is connected via a communication path 195 to another computing device 150. Each computing device 100, 150 includes a port speed negotiation system 110. Also, computing device 100 includes a link speed storage structure 120, a network adapter 130, and one or more ports 140. Computing device 150 includes a link speed storage structure 170, a network adapter 180, and one or more ports 190. Each network adapter 130, 180 is capable of transmitting and receiving packets of data over communication path 195 via ports 140, 190.

The computing devices 100, 150 may each comprise any computing device known in the art, such as a server, mainframe, workstation, personal computer, hand held computer, laptop telephony device, network appliance, etc.

The communication path 195 may comprise any type of communication path, such as a fibre channel cable, Ethernet cable or a wireless path.

Certain embodiments are directed to fibre channel ports that are configured to use link speed negotiation. Embodiments remember the link speed at which the port is operating before a concurrent codeload. In the case of a port that is configured to negotiate link speed, this link speed is the result of a prior link speed negotiation with the attached port, and represents the maximum supported link speed on the link. After concurrent codeload, rather than renegotiating link speed, the port bypasses the configuration setting and attempts to initialize the link at the same fixed link speed it was using prior to concurrent codeload.

Figure 2A:
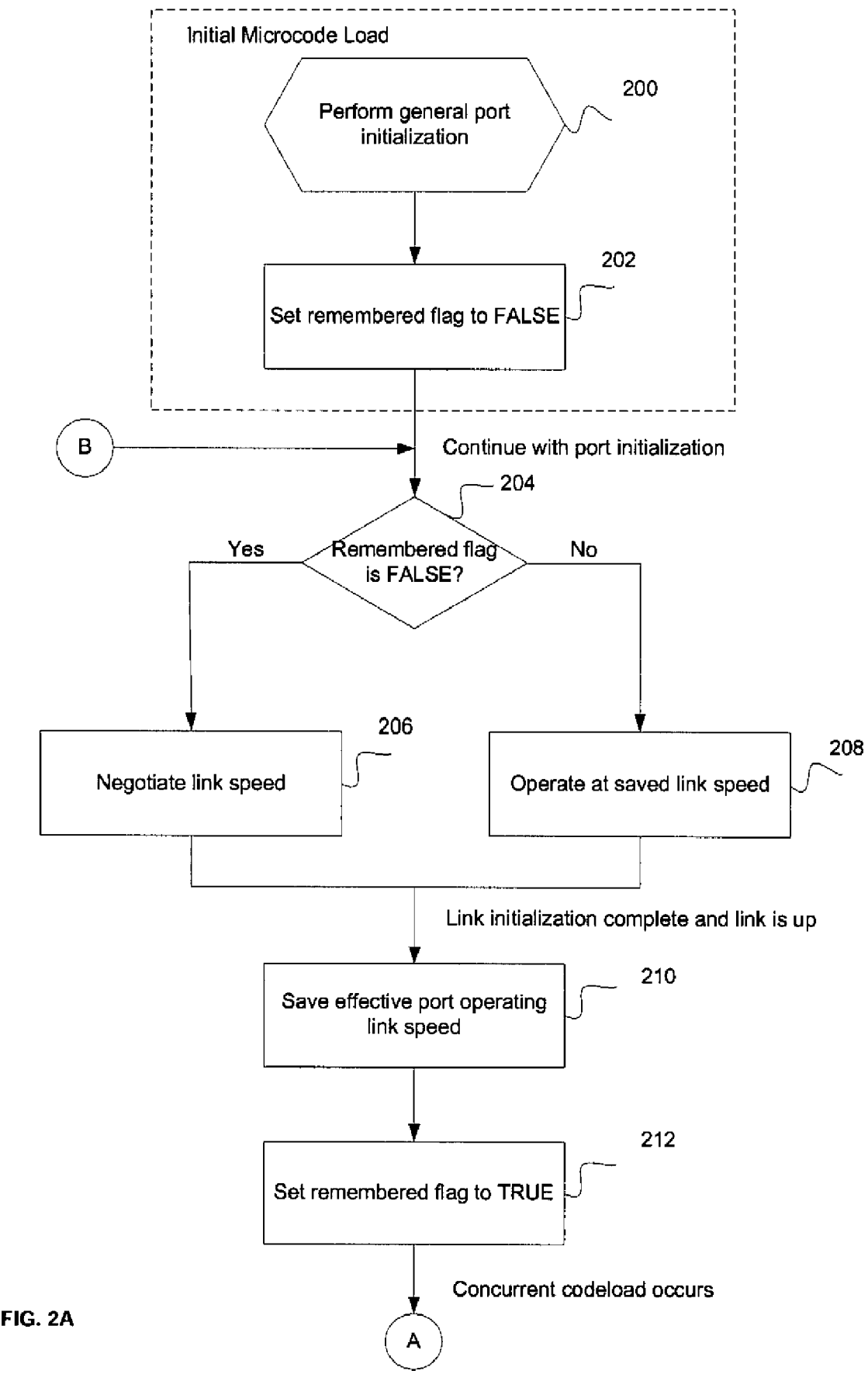
FIGS. 2A and 2B illustrate logic performed in accordance with certain embodiments.
Figure 2B:
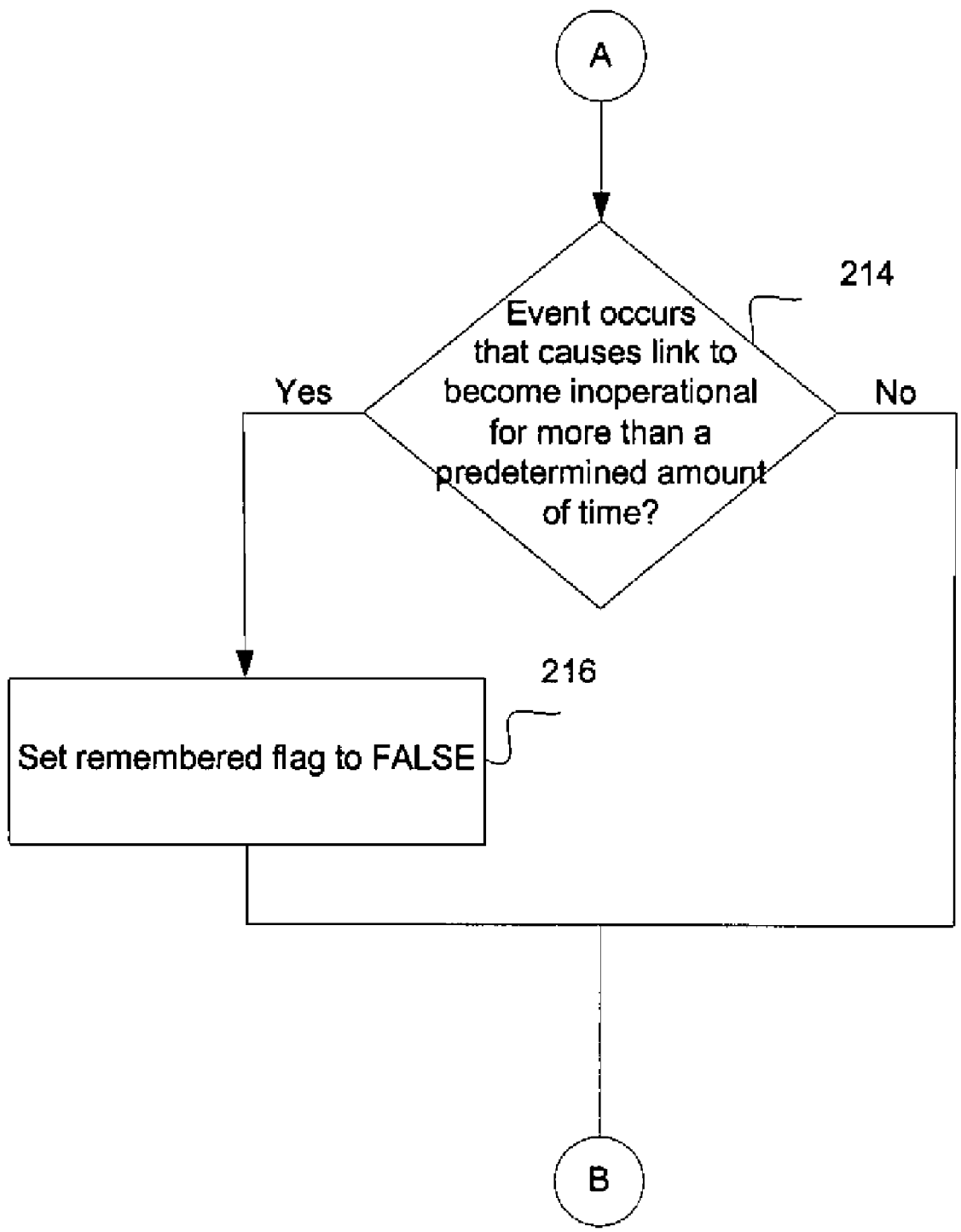

FIGS. 2A and 2B illustrate logic performed in accordance with certain embodiments. Control begins in FIG. 2A at block 200 with the computing device 100, 150 performing general port initialization as part of the Initial Microcode Load (IML). Also, during the IML, in block 202, the computing device 100, 150 sets a remembered indicator (e.g., flag) to FALSE. In certain embodiments, the remembered indicator is stored in the link speed storage structure 120, 170. After IML, processing continues with port initialization.

In block 204, the port speed negotiation system 110 determines whether the remembered indicator is set to FALSE. The first time processing reaches block 204, the remembered indicator is set to FALSE (see block 202), but, in subsequent processing, the remembered indicator may be set to TRUE. If the remembered indicator is set to FALSE, processing continues to block 206, otherwise, processing continues to block 208. In block 206, the port speed negotiation system 110 tells the port 140, 190 to negotiate link speed. In block 208, the port speed negotiation system 110 tells the port 140, 190 to operate at a saved operating link speed retrieved from a link speed storage structure 120, 170.

Once the link speed has been determined (either by negotiation or using a stored link speed), it is said that link initialization has completed and the link comes up (i.e., becomes operational). When this happens, in block 210, the port speed negotiation system 110 saves the effective port operation link speed in a link speed storage structure (e.g., a variable, a table, etc.). In certain embodiments, the last link speed is stored. In certain embodiments, multiple past link speeds are stored, and the port speed negotiation system 110 selects one for use in block 208. Also, in block 212, the port speed negotiation system sets the remembered indicator to TRUE.

From block 212 (FIG. 2A), processing continues to block 214 (FIG. 2B). In block 214, if it is determined that an event has occurred that causes the link to become inoperational for more than a predetermined amount of time (e.g., two seconds), then processing continues to block 216, otherwise, processing loops back to block 204 (FIG. 2A).

In block 216, the port speed negotiation system 110 sets the remembered indicator to FALSE. From block 216, processing loops back to block 204 (FIG. 2A).

In certain embodiments, when the link goes down (i.e., becomes inoperational), a timer (e.g., for two seconds) is set. If the timer expires, the port speed negotiation system 110 sets the remembered indicator to FALSE. In certain embodiments, the remembered link speed is also cleared (i.e., when one link speed is stored). Then, the port 140, 190 is instructed to perform the link speed negotiation when the link comes back up. The use of the predetermined amount of time (e.g., two seconds) guards against the potential for the attached port 140, 190 to have changed, such as user moving a cable, which is highly unlikely to occur in less than the predetermined amount of time seconds. If the link comes up within the predetermined amount of time, the timer is reset by the port speed negotiation system 110.

Returning to FIG. 2A, block 204, after concurrent codeload, during link initialization, if the remembered indicator is not set to FALSE, then the port 140, 190 is instructed to operate at the remembered link speed rather than perform the link speed negotiation.

Thus, in certain embodiments, when a link between two computing devices is operational, a link speed for use in communicating across the link is stored, a remembered indicator is set to TRUE, and, after any event occurs that causes the link to become inoperational, in response to determining that the remembered indicator is TRUE, the stored link speed is used when attempting to make the link become operational. Examples of events include anything that may cause link initialization to occur (e.g., situations a-d described above).

Thus, embodiments eliminate the delay of executing the link speed negotiation algorithm on the storage ports after concurrent codeload, thereby potentially saving hundreds of milliseconds on the link initialization after concurrent codeload and greatly reducing the chance of path loss.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The computer-usable medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk-read only memory (CD-ROM), compact disk-read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 2A and 2B describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 2A and 2B may be implemented in software, hardware, programmable and non-programmable gate array logic or in some combination of hardware, software, or gate array logic.

Figure 3:
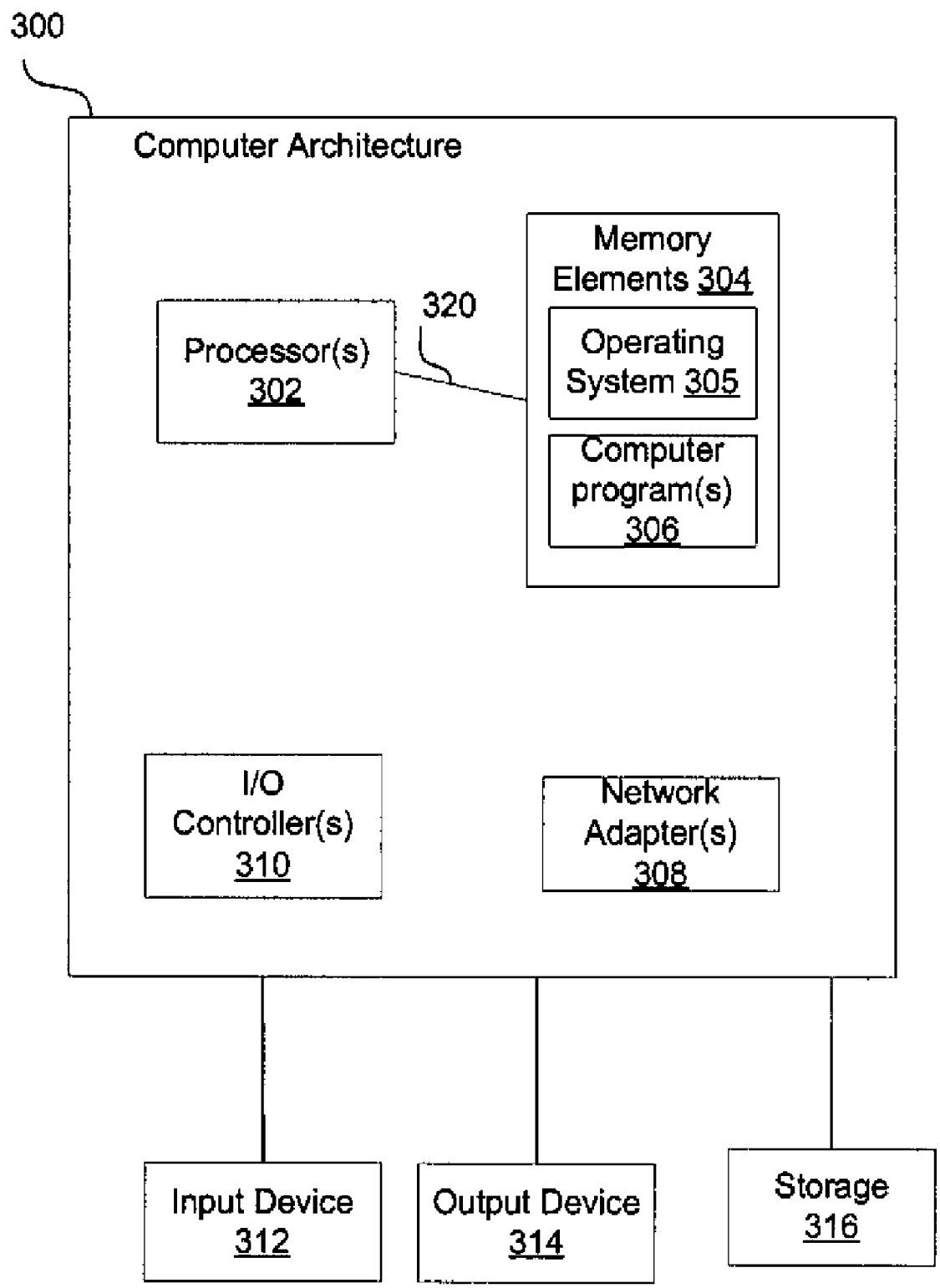
FIG. 3 illustrates a system architecture that may be used in accordance with certain embodiments.

FIG. 3 illustrates a system architecture 300 that may be used in accordance with certain embodiments. Computing device 100 and/or computing device 150 may implement system architecture 300. The system architecture 300 is suitable for storing and/or executing program code and includes at least one processor 302 coupled directly or indirectly to memory elements 304 through a system bus 320. The memory elements 304 may include local memory employed during actual execution of the program code, bulk storage, and cache memories which provide temporary storage of at least some program code in order to reduce the number of times code must be retrieved from bulk storage during execution. The memory elements 304 include an operating system 305 and one or more computer programs 306.

Input/Output (I/O) devices 312, 314 (including but not limited to keyboards, displays, pointing devices, etc.) may be coupled to the system either directly or through intervening I/O controllers 310.

Network adapters 308 may also be coupled to the system to enable the data processing system to become coupled to other data processing systems or remote printers or storage devices through intervening private or public networks. Modems, cable modem and Ethernet cards are just a few of the currently available types of network adapters 308.

The system architecture 300 may be coupled to storage 316 (e.g., a non-volatile storage area, such as magnetic disk drives, optical disk drives, a tape drive, etc.). The storage 316 may comprise an internal storage device or an attached or network accessible storage. Computer programs 306 in storage 316 may be loaded into the memory elements 304 and executed by a processor 302 in a manner known in the art.

The system architecture 300 may include fewer components than illustrated, additional components not illustrated herein, or some combination of the components illustrated and additional components. The system architecture 300 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer-implemented method for determining a link speed, comprising:
    performing general port initialization;
    setting a remembered indicator to FALSE;
    when a link between two computing devices is operational,
        storing a link speed for use in communicating across the link; and
        setting the remembered indicator to TRUE; and
    after any event occurs that causes the link to become inoperational, in response to determining that the remembered indicator is TRUE, using the stored link speed when attempting to make the link become operational.

2. The method of claim 1, further comprising:
    in response to determining that the remembered indicator is FALSE, negotiating the link speed.

3. The method of claim 1, further comprising:
in response to determining that the link is not operational for more than a predetermined period of time, setting the remembered indicator to FALSE.

4. The method of claim 1, wherein the link comprises a fibre channel port link.

5. The method of claim 1, wherein the event is a concurrent codeload.

6. A computer program product comprising a computer-readable storage medium including a computer readable program, wherein the computer readable program when executed on a computer causes the computer to:
perform general port initialization;
set a remembered indicator to FALSE;
when a link between two computing devices is operational,
store a link speed for use in communicating across the link; and
set the remembered indicator to TRUE; and
after any event occurs that causes the link to become inoperational, in response to determining that the remembered indicator is TRUE, use the stored link speed when attempting to make the link become operational.

7. The computer program product of claim 6, wherein the computer readable program when executed on a computer causes the computer to:
in response to determining that the remembered indicator is FALSE, negotiate the link speed.

8. The computer program product of claim 6, wherein the computer readable program when executed on a computer causes the computer to:
in response to determining that the link is not operational for more than a predetermined period of time, set the remembered indicator to FALSE.

9. The computer program product of claim 6, wherein the link comprises a fibre channel port link.

10. The computer program product of claim 6, wherein the event is a concurrent codeload.

11. A system, comprising:
hardware logic capable of performing operations, the operations comprising:
performing general port initialization;
setting a remembered indicator to FALSE;
when a link between two computing devices is operational,
storing a link speed for use in communicating across the link; and
setting the remembered indicator to TRUE; and
after any event occurs that causes the link to become inoperational, in response to determining that the remembered indicator is TRUE, using the stored link speed when attempting to make the link become operational.

12. The system of claim 11, wherein the operations further comprise:
in response to determining that the remembered indicator is FALSE, negotiating the link speed.

13. The system of claim 11, wherein the operations further comprise:
in response to determining that the link is not operational for more than a predetermined period of time, setting the remembered indicator to FALSE.

14. The system of claim 11, wherein the link comprises a fibre channel port link.

15. The system of claim 11, wherein the event is a concurrent codeload.

* * * * *